(12) United States Patent
Murdock, IV et al.

(10) Patent No.: US 11,138,521 B2
(45) Date of Patent: *Oct. 5, 2021

(54) SYSTEM AND METHOD FOR DEFINING AND USING DIFFERENT LEVELS OF GROUND TRUTH

(71) Applicant: International Business Machines Corporation, Armonk, NY (US)

(72) Inventors: James W. Murdock, IV, Amawalk, NY (US); Stephan J. Roorda, Fuquay-Varina, NC (US); Mary D. Swift, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 575 days.

This patent is subject to a terminal disclaimer.

(21) Appl. No.: 16/141,203

(22) Filed: Sep. 25, 2018

(65) Prior Publication Data
US 2019/0026656 A1 Jan. 24, 2019

Related U.S. Application Data

(63) Continuation of application No. 14/861,254, filed on Sep. 22, 2015, now Pat. No. 10,169,718, which is a continuation of application No. 14/825,423, filed on Aug. 13, 2015, now Pat. No. 10,169,717.

(51) Int. Cl.
| | |
|---|---|
| *G06N 20/00* | (2019.01) |
| *G09B 7/02* | (2006.01) |
| *G09B 19/06* | (2006.01) |
| *G06N 5/04* | (2006.01) |
| *G06N 5/02* | (2006.01) |
| *G09B 7/00* | (2006.01) |

(52) U.S. Cl.
CPC ............ *G06N 20/00* (2019.01); *G06N 5/022* (2013.01); *G06N 5/04* (2013.01); *G09B 7/00* (2013.01); *G09B 7/02* (2013.01); *G09B 19/06* (2013.01)

(58) Field of Classification Search
CPC ...... G06N 99/005; G06N 20/00; G06N 5/022; G06N 5/04; G09B 7/00; G09B 7/02; G09B 19/06; G06F 17/30477; G06F 17/30424; G06F 17/30663
USPC ......................................................... 706/12
See application file for complete search history.

(56) References Cited

U.S. PATENT DOCUMENTS

2008/0319932 A1* 12/2008 Yih .................. G06Q 10/10
706/20
2013/0226857 A1* 8/2013 Shim .................... H04W 4/029
706/52
(Continued)

FOREIGN PATENT DOCUMENTS

CN 101520802 A 9/2009

*Primary Examiner* — Dave Misir
(74) *Attorney, Agent, or Firm* — Stephen R Yoder (57) ABSTRACT

A method, computer program product, and computer system, for receiving a first set of ground truth instances from a first source. A second set of ground truth instances may be received from a second source. The first and second sets of ground truth instances may be weighed differently based on a level of trust associated with each of the first and second sources. The weighted first and second sets of ground truth instances may be applied in a machine learning task executed by a computer.

12 Claims, 6 Drawing Sheets

(56) References Cited

U.S. PATENT DOCUMENTS

| | | | |
|---|---|---|---|
| 2013/0346356 A1* | 12/2013 | Welinder | G06K 9/6254 706/52 |
| 2014/0272884 A1 | 9/2014 | Allen et al. | |
| 2014/0272909 A1* | 9/2014 | Isensee | G09B 7/02 434/362 |
| 2014/0297571 A1* | 10/2014 | Beamon | G06F 16/313 706/12 |
| 2014/0298199 A1* | 10/2014 | Johnson, Jr. | H04L 65/403 715/753 |
| 2015/0156185 A1* | 6/2015 | Arunkumar | G06F 21/50 726/4 |
| 2015/0215590 A1* | 7/2015 | Nowozin | H04N 9/04515 348/242 |

* cited by examiner

SYSTEM AND METHOD FOR DEFINING AND USING DIFFERENT LEVELS OF GROUND TRUTH

RELATED APPLICATIONS

The subject application is a continuation application of U.S. patent application with Ser. No. 14/861,254, filed on Sep. 22, 2015, which is a continuation application of U.S. patent application with Ser. No. 14/825,423, filed on Aug. 13, 2015, the entire content of which are herein incorporated by reference.

BACKGROUND

Some traditional QA systems may engage Subject Matter Experts (SMEs) to create the ground truth (candidate QA pairs) as part of QA system training. In some QA systems, the collection of this ground truth may be difficult and time consuming. For example, the process for this may have a unique set of questions that are given to each SME to create this set. In other example systems, a collaborative model may be used where each SME is given the same questions and then through a group decision (e.g., voting) come up with the most popular answers that are used to create the set. Thus, the collection of this ground truth may be one of the larger costs and efforts put forth when adapting to a new domain or customer.

BRIEF SUMMARY OF DISCLOSURE

In one example implementation, a method, performed by one or more computing devices, may include but is not limited to receiving, by a computing device, a first set of ground truth instances from a first source. A second set of ground truth instances may be received from a second source. The first and second sets of ground truth instances may be weighed differently based on a level of trust associated with each of the first and second sources. The weighted first and second sets of ground truth instances may be applied in a machine learning task executed by a computer.

One or more of the following example features may be included. Applying the weighted first and second sets of ground truth instances in a machine learning task may include adjusting a loss function for at least one of the first and second sets of ground truth instances based upon, at least in part, the level of trust associated with each of the first and second sources. Applying the weighted first and second sets of ground truth instances in the machine learning task may include at least one of a mean-squared error and duplication of instances for the first set of ground truth instances more than the second set of ground truth instances. A third set of ground truth instances may be received from a third source. The third set of ground truth instances may be weighed differently than the first and second sets of ground truth instances based on a level of trust associated with each of the first, second, and third sources, wherein the weighted first, second, and third sets of ground truth instances may be applied in the machine learning task. The level of trust associated with the first set of ground truth instances may be indicative of validation of the first set of ground truth instances by a subject matter expert. The level of trust associated with the second set of ground truth instances may be indicative of validation of the second set of ground truth instances by QA system developer, and wherein the level of trust associated with the third set of ground truth instances may be indicative of validation of the third set of ground truth instances by a threshold number of crowdsource users. An answer in the second set of ground truth instances may be updated for association with the first set of ground truth instances in response to receiving validation of the answer from a subject matter expert.

In another example implementation, a computing system includes a processor and a memory configured to perform operations that may include but are not limited to, receiving a first set of ground truth instances from a first source. A second set of ground truth instances may be received from a second source. The first and second sets of ground truth instances may be weighed differently based on a level of trust associated with each of the first and second sources. The weighted first and second sets of ground truth instances may be applied in a machine learning task executed by a computer.

One or more of the following example features may be included. Applying the weighted first and second sets of ground truth instances in a machine learning task may include adjusting a loss function for at least one of the first and second sets of ground truth instances based upon, at least in part, the level of trust associated with each of the first and second sources. Applying the weighted first and second sets of ground truth instances in the machine learning task may include at least one of a mean-squared error and duplication of instances for the first set of ground truth instances more than the second set of ground truth instances. A third set of ground truth instances may be received from a third source. The third set of ground truth instances may be weighed differently than the first and second sets of ground truth instances based on a level of trust associated with each of the first, second, and third sources, wherein the weighted first, second, and third sets of ground truth instances may be applied in the machine learning task. The level of trust associated with the first set of ground truth instances may be indicative of validation of the first set of ground truth instances by a subject matter expert. The level of trust associated with the second set of ground truth instances may be indicative of validation of the second set of ground truth instances by QA system developer, and wherein the level of trust associated with the third set of ground truth instances may be indicative of validation of the third set of ground truth instances by a threshold number of crowdsource users. An answer in the second set of ground truth instances may be updated for association with the first set of ground truth instances in response to receiving validation of the answer from a subject matter expert.

In another example implementation, a computer program product resides on a computer readable storage medium that has a plurality of instructions stored on it. When executed by a processor, the instructions cause the processor to perform operations that may include but are not limited to, receiving a first set of ground truth instances from a first source. A second set of ground truth instances may be received from a second source. The first and second sets of ground truth instances may be weighed differently based on a level of trust associated with each of the first and second sources. The weighted first and second sets of ground truth instances may be applied in a machine learning task executed by a computer.

One or more of the following example features may be included. Applying the weighted first and second sets of ground truth instances in a machine learning task may include adjusting a loss function for at least one of the first and second sets of ground truth instances based upon, at least in part, the level of trust associated with each of the first and second sources. Applying the weighted first and second sets of ground truth instances in the machine learning task may include at least one of a mean-squared error and duplication of instances for the first set of ground truth instances more than the second set of ground truth instances. A third set of ground truth instances may be received from a third source. The third set of ground truth instances may be weighed differently than the first and second sets of ground truth instances based on a level of trust associated with each of the first, second, and third sources, wherein the weighted first, second, and third sets of ground truth instances may be applied in the machine learning task. The level of trust associated with the first set of ground truth instances may be indicative of validation of the first set of ground truth instances by a subject matter expert. The level of trust associated with the second set of ground truth instances may be indicative of validation of the second set of ground truth instances by QA system developer, and wherein the level of trust associated with the third set of ground truth instances may be indicative of validation of the third set of ground truth instances by a threshold number of crowdsource users. An answer in the second set of ground truth instances may be updated for association with the first set of ground truth instances in response to receiving validation of the answer from a subject matter expert.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
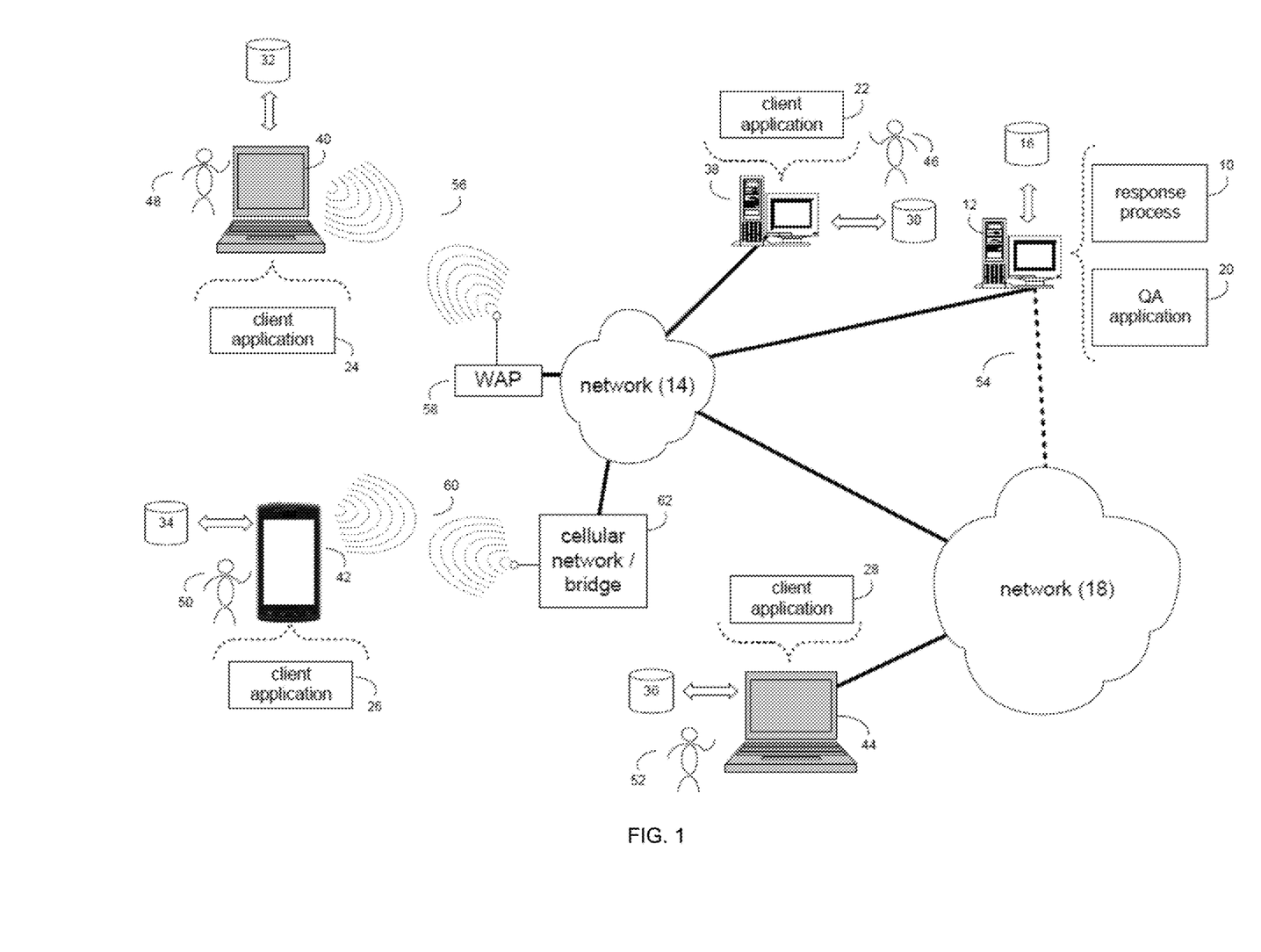
FIG. 1 is an example diagrammatic view of a response process coupled to a distributed computing network according to one or more example implementations of the disclosure.

Referring now to FIG. 1, there is shown response process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, response process 10 may receive a first set of ground truth instances from a first source. A second set of ground truth instances may be received from a second source. The first and second sets of ground truth instances may be weighed differently based on a level of trust associated with each of the first and second sources. The weighted first and second sets of ground truth instances may be applied in a machine learning task executed by a computer.

The instruction sets and subroutines of response process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Response process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a Question Answering (QA) system application, such as (e.g., QA application 20), examples of which may include, but are not limited to, e.g., the IBM Watson™ application or other QA application, a search engine application, a natural language processing (NLP) application, or other application that allows for the answering of questions posed by a user by querying stored information, e.g., in a data store. Response process 10 and/or QA application 20 may be accessed via client applications 22, 24, 26, 28. Response process 10 may be a stand alone application, or may be an applet/application/script/extension that may interact with and/or be executed within QA application 20, a component of QA application 20, and/or one or more of client applications 22, 24, 26, 28. QA application 20 may be a stand alone application, or may be an applet/application/script/extension that may interact with and/or be executed within response process 10, a component of response process 10, and/or one or more of client applications 22, 24, 26, 28. One or more of client applications 22, 24, 26, 28 may be a stand alone application, or may be an applet/application/script/extension that may interact with and/or be executed within and/or be a component of response process 10 and/or QA application 20. Examples of client applications 22, 24, 26, 28 may include, but are not limited to, e.g., the IBM Watson™ application or other QA application, a search engine application, a natural language processing (NLP) application, or other application that allows for the answering of questions posed by a user by querying stored information, e.g., in a data store, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of response process 10 (and vice versa). Accordingly, response process 10 may be a purely server-side application, a purely client-side application, or a hybrid server-side/client-side application that is cooperatively executed by one or more of client applications 22, 24, 26, 28 and/or response process 10.

One or more of client applications 22, 24, 26, 28 may be configured to effectuate some or all of the functionality of QA application 20 (and vice versa). Accordingly, QA application 20 may be a purely server-side application, a purely client-side application, or a hybrid server-side/client-side application that is cooperatively executed by one or more of client applications 22, 24, 26, 28 and/or QA application 20. As one or more of client applications 22, 24, 26, 28, response process 10, and QA application 20, taken singly or in any combination, may effectuate some or all of the same functionality, any description of effectuating such functionality via one or more of client applications 22, 24, 26, 28, response process 10, QA application 20, or combination thereof, and any described interaction(s) between one or more of client applications 22, 24, 26, 28, response process 10, QA application 20, or combination thereof to effectuate such functionality, should be taken as an example only and not to limit the scope of the disclosure.

Users 46, 48, 50, 52 may access computer 12 and response process 10 (e.g., using one or more of client electronic devices 38, 40, 42, 44) directly through network 14 or through secondary network 18. Further, computer 12 may be connected to network 14 through secondary network 18, as illustrated with phantom link line 54. Response process 10 may include one or more user interfaces, such as browsers and textual or graphical user interfaces, through which users 46, 48, 50, 52 may access response process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
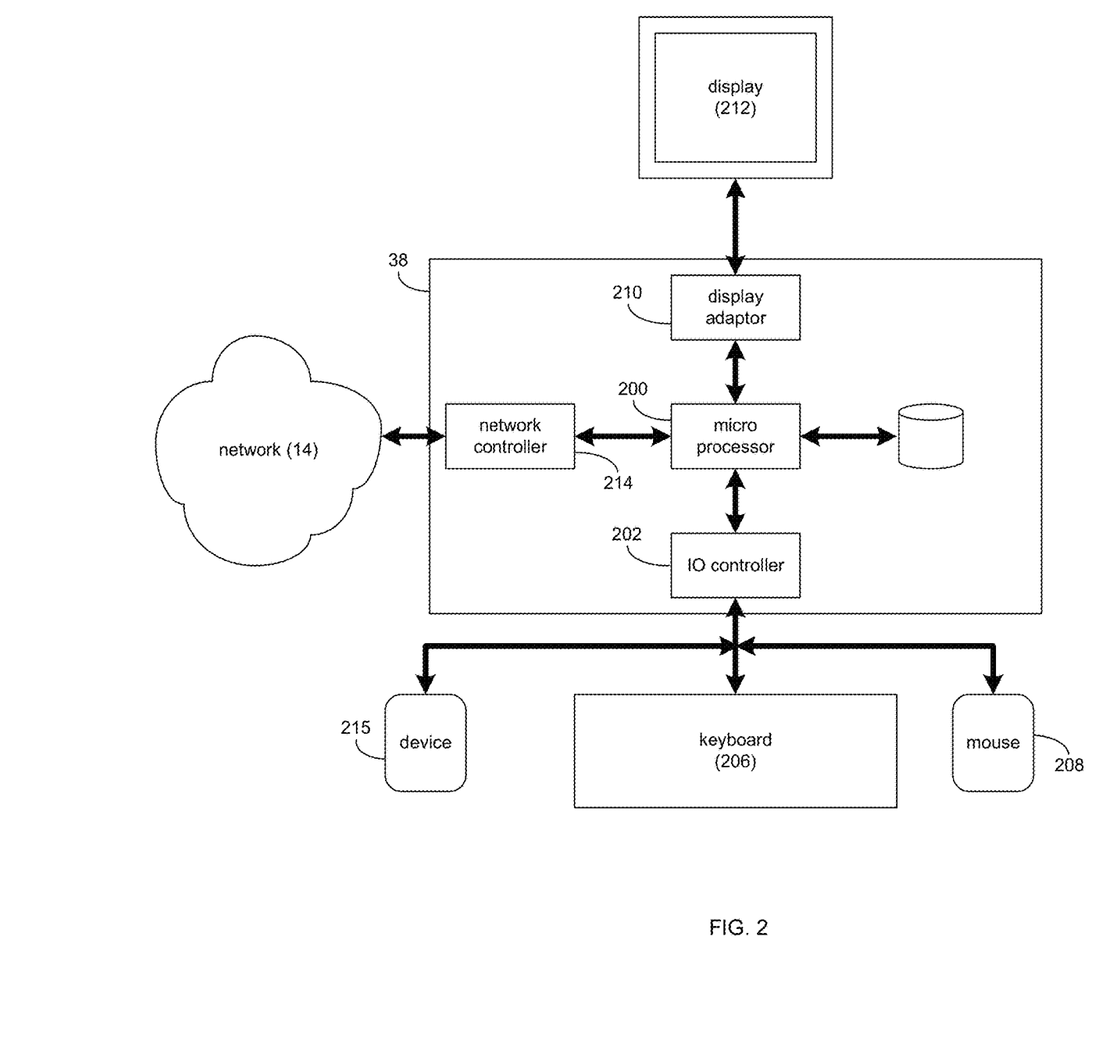
FIG. 2 is an example diagrammatic view of a client electronic device of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, response process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Question Answering (QA) systems, such as the IBM Watson™ system, may include an application of advanced natural language processing, information retrieval, knowledge representation and reasoning, and machine learning technologies to the field of open domain question answering. The IBM Watson™ system may be built on IBM's DeepQA technology (or other compatible technology) used for hypothesis generation, massive evidence gathering, analysis, and scoring. The IBM Watson™ system may take an input question, analyze it, decompose the question into constituent parts, generate one or more hypothesis based on the decomposed question and results of a primary search of answer sources, perform hypothesis and evidence scoring based on a retrieval of evidence from evidence sources, perform synthesis of the one or more hypothesis, and based on trained models, perform a final merging and ranking to output an answer to the input question along with a confidence measure.

Some example QA systems may engage Subject Matter Experts (SMEs) to create the ground truth (candidate QA pairs) as part of QA system training. In some QA systems, the collection of this ground truth may be difficult and time consuming. For example, the process for this may have a unique set of questions that are given to each SME to create this set. In other example systems, a collaborative model may be used where each SME is given the same questions and then through a group decision (e.g., voting) come up with the most popular answers that are used to create the set. Thus, the collection of this ground truth may be one of the larger costs and efforts put forth when adapting to a new domain or customer.

The Response Process:

As discussed above and referring also at least to FIGS. 3-6, response process 10 may receive 302 a first set of ground truth instances from a first source. A second set of ground truth instances may be received 304 by response process 10 from a second source. The first and second sets of ground truth instances may be weighed 306 differently by response process 10 based on a level of trust associated with each of the first and second sources. The weighted first and second sets of ground truth instances may be applied 308 by response process 10 in a machine learning task executed by a computer.

Figure 3:
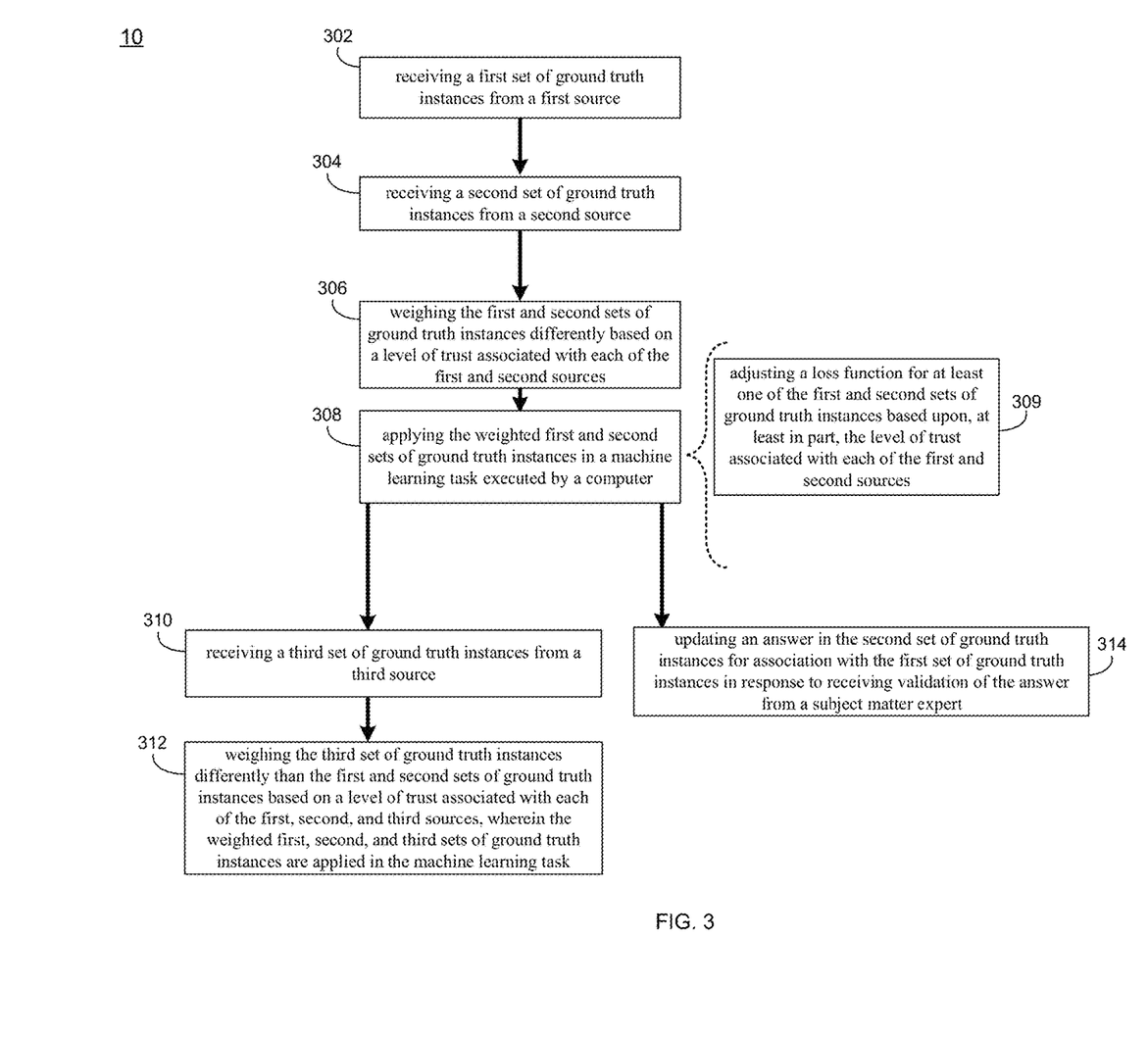
FIG. 3 is an example flowchart of the response process of FIG. 1 according to one or more example implementations of the disclosure.

In some implementations, response process 10 may analyze a plurality of ground truth instances. Generally, a "ground truth instance" may be described as a single input-output pair for which someone has judged the output to be valid given that input. As the present disclosure may be used in association with question answering, each input may be a question and each output may be an answer that someone has identified as a correct answer to that question. Thus, in the example, a single ground truth instance may be a single QA pair, whereas multiple QA pairs may be referred to as a set of ground truth instances or simply a ground truth. For example, response process 10 may be applied, e.g., at least during the ground truth creation, which may enable teaching or training QA application 20/response process 10. For example, response process 10 may create "levels" of ground truth. Each level may be indicative of the confidence in the ground truth (e.g., the level of trust in the answer key/source stating that the answer is correct and the degree to which the source indicates that the answer is correct). Each level may be organized in the above-noted data store of computer 12. Response process 10 may use these levels in the machine learning to help train QA application 20/response process 10, such that, e.g., response process 10 may know that a ground truth instance (e.g., QA pair) at a higher level has some greater value (and thus confidence in the answer) than a QA pair at a lower level. This may enable the collection of less ground truth and the use of less subject matter expert (SME) time and effort to curate the ground truth. Additionally, the graduated confidence scores derived from the different levels of ground truth may be used to tailor system interaction for answers that may be less than perfect (i.e., not at the top or "gold" level).

In some implementations, for a particular domain and/or customer, there may be a plurality of ground truth instances. In some implementations, response process 10 may receive 302 a first set of ground truth instances from a first source. For example, for a first answer associated with the plurality of ground truth instances (e.g., the first set of ground truth instances), a first source validating the first answer may be determined by response process 10. For instance, assume for example purposes only that there may be multiple sources that may be able to validate a particular answer in a QA pair instance. In the example, assume the potential sources include, e.g., a subject matter expert (SME), a developer of QA application 20, a threshold number of crowdsource users, etc. Each potential source may validate a particular answer using traditional techniques, e.g., via a computing device such as client electronic device 38. It will be appreciated that various other sources and combinations thereof may also be used to validate a particular answer without departing from the scope of the disclosure.

Continuing with the above example, further assume that the first answer may be associated by response process 10 with a first hierarchical confidence level based upon, at least in part, the first source validating the first answer. In the example, the level of trust associated with the first set of ground truth instances may be indicative of validation of the first set of ground truth instances by a subject matter expert. For instance, associating the first answer with the first hierarchical confidence level may be indicative of validation of the first answer by a subject matter expert. In some implementations, a second set of ground truth instances may be received 304 by response process 10 from a second source. For instance, for a second answer associated with the plurality of ground truth instances (e.g., the second set of ground truth instances), a second source validating the second answer may be determined by response process 10. In the example, the level of trust associated with the second set of ground truth instances may be indicative of validation of the second set of ground truth instances by a QA system developer. For instance, associating the second answer with the second hierarchical confidence level may be indicative of validation of the second answer by QA system developer. For instance, assume for example purposes only that the second answer may be selected by QA application 20, and validated (e.g., as acceptable) by a developer of QA application 20, but not validated by an SME. Continuing with the above example, the second answer may be associated by response process 10 with a second hierarchical confidence level based upon, at least in part, the second source validating the second answer.

As will be discussed in greater detail below, the first and second sets of ground truth instances may be weighed 306 differently based on a level of trust associated with each of the first and second sources. In the example, the first answer associated with the first hierarchical confidence level may be indicative of a higher confidence level in the first source than the second source. In some implementations, the first answer associated with the first hierarchical confidence level may be preferred more than the second answer associated with the second hierarchical confidence level. For instance, assume for example purposes only that the first answer and the second answer are answers directed towards the same question. Further assume that there is more confidence in an answer validated by a SME than an answer validated by a developer of QA application 20. Thus, in the example, since the first answer was determined to be validated by a more trusted source (e.g., the SME), the more trusted first answer may be associated with the first hierarchical confidence level; and since the second answer was determined to be validated by a less trusted source (e.g., a developer of QA application 20 and not validated by the SME), the less trusted second answer may be associated with the second hierarchical confidence level. Therefore, in the example, there may be a higher confidence in the first source (and therefore the first answer associated with the first hierarchical confidence level) than in the second source (and therefore the second answer associated with the second hierarchical confidence level).

As such, in the example, there may be a ranking that returns the first answer over the second answer (e.g., in response to a query involving the associated question for the first and second answer). It will be appreciated that various techniques to return answers may be used without departing from the scope of the disclosure. For example, both answers may be returned and may be ranked according to the hierarchical confidence level associated with the respective answer. For example, if both answers are returned, the first answer associated with the first hierarchical confidence level may be returned and ranked higher than the second answer associated with the second hierarchical confidence level. In some implementations, only the answer associated with the highest available hierarchical confidence level may be returned. For instance, in the example, only the first answer would be returned since it is associated with a higher hierarchical confidence level than the second answer. As such, any specific technique to return answers should be taken as example only and not to otherwise limit the scope of the disclosure.

Continuing with the above example, in some implementations, various other hierarchical confidence levels may be included. For example, a third set of ground truth instances may be received 310 from a third source, and, as will be discussed further below, the third set of ground truth instances may be weighed 312 differently than the first and second sets of ground truth instances based on a level of trust associated with each of the first, second, and third sources. For instance, for a third answer associated with the plurality of ground truth instances, a third source validating the third answer may be determined by response process 10. The third answer may be associated by response process 10 with a third hierarchical confidence level based upon, at least in part, the third source validating the third answer, wherein the second answer associated with the second hierarchical confidence level may be preferred more than the third answer associated with the third hierarchical confidence level.

For instance, assume for example purposes only that the third answer may be selected by QA application 20, and validated (e.g., as acceptable) by at least, e.g., three crowdsourcing users, but not validated by a developer of QA application 20 or a SME. For example, crowdsourcing may be accomplished by, e.g., a service provided where users may sign up to take on problems and respond with their opinions to train QA application 20. For instance, in some implementations, the crowdsource users may see the user interface and the responses of QA application 20, and may mark them as "good" or "bad" for the validation. In the example, the level of trust associated with the third set of ground truth instances may be indicative of validation of the third set of ground truth instances by a threshold number of crowdsource users. For instance, associating the third answer with the third hierarchical confidence level may be indicative of validation of the third answer by a threshold number of crowdsource users. In the example, when a threshold number of crowdsource users (e.g., at least three) validate (e.g., via response process 10) the third answer as "good", response process 10 may associate the third answer with the third hierarchical confidence level. In some implementations, the crowdsource users may not necessarily be directly associated with the particular domain for the question being asked. For instance, the crowdsource users may not be a developer of QA application 20 or a customer/SME associated with the particular domain for the question being validated by the crowdsource users.

Assume for example purposes only that the first answer, the second answer, and the third answer are answers directed towards the same question. Further assume that there is more confidence in an answer validated by a SME than an answer validated by a developer of QA application 20, and more confidence in an answer validated by a developer of QA application 20 than an answer validated by crowdsource users. Thus, in the example, since the first answer was determined to be validated by a more trusted source (e.g., the SME), the more trusted first answer may be associated with the first hierarchical confidence level; since the second answer was determined to be validated by a less trusted source (e.g., a developer of QA application 20 and not validated by the SME), the less trusted second answer may be associated with the second hierarchical confidence level; and since the third answer was determined to be validated by an even lesser trusted source (e.g., a threshold number of crowdsource users and not by a developer of QA application 20 and/or the SME), the lesser trusted third answer may be associated with the third hierarchical confidence level. Therefore, in the example, there may be a higher confidence in the first source (and therefore the first answer associated with the first hierarchical confidence level) than in the second source (and therefore the second answer associated with the second hierarchical confidence level) and/or the third source (and therefore the third answer associated with the third hierarchical confidence level). In some implementations, response process 10 may be trained such that it prefers a first hierarchical confidence level match over second hierarchical confidence level or third hierarchical confidence level matches, but may still use the second hierarchical confidence level or even the third hierarchical confidence level matches as a fall-back strategy.

As noted above, the first and second sets of ground truth instances may be weighed 306 differently based on a level of trust associated with each of the first and second sources. In some implementations, the weighted 306 first and second sets of ground truth instances may be applied 308 in a machine learning task executed by a computer. For instance, for statistical machine learning, response process 10 may up-weigh the first hierarchical confidence level instances more than the second and third hierarchical confidence levels. For instance, applying 308 the weighted first and second sets of ground truth instances in the machine learning task may include adjusting 309 a loss function for at least one of the first and second sets of ground truth instances based upon, at least in part, the level of trust associated with each of the first and second sources. In some implementations, the loss function for the first set of ground truth instances may be adjusted 309 more than the second set of ground truth instances. For example, a loss function may be adjusted 309 for the first answer and the second answer based upon, at least in part, the first source validating the first answer and the second source validating the second answer, wherein the loss function for the first answer validated by the first source may be adjusted 309 more than the second answer validated by the second source. For instance, in general, statistical machine learning algorithms (which may be included as part of response process 10) may be designed to minimize "loss" (or equivalently, maximize "gain" where "gain" may be defined as 0-loss) on some training data (e.g., the set of ground truth instances). In the example, response process 10 may revise or adjust 309 the "loss" function for the learning to provide more loss when the model (executed by response process 10) fails to match the outcome on a more highly trusted ground truth answer (e.g., the first hierarchical confidence level) than it does when the model fails to match the outcome on a less trusted confidence ground truth answer but still provide some loss even for the lower levels of trust (e.g., the second and third hierarchical confidence levels). This example approach may provide better results than learning over just your highly trusted ground truth instances, at least because response process 10 may learn from a larger quantity of data. Response process 10 may provide better results than learning over all of the ground truth instances without differentiating among them, at least because the model may be more highly influenced by the more trusted instances and may be only moderately influenced by the less trusted ones.

In some implementations, applying 308 the weighted first and second sets of ground truth instances in the machine learning task may include at least one of a mean-squared error and duplication of instances for the first set of ground truth instances more than the second set of ground truth instances. For instance, as another example of adjusting 309 a loss function, a mean-squared-error may be used by response process 10, in which the loss for a training set may be the mean across all instances in the set of the square of the error. In this context (e.g., question-answer pairs), with ground truth instances marked as right or wrong, response process 10 may define "error" to be the confidence in the answer if that answer is wrong and one minus the confidence in the answer if that answer is right. When a learning algorithm (such as an example learning algorithm used by response process 10) finds a model that minimizes the mean-squared error for a training set, that model may produce higher confidences for right answers (and thus associated with a higher hierarchical confidence level) and lower confidences on wrong answers (and thus associated with a lower hierarchical confidence level respectively) than competing models. In some implementations, an example technique for response process 10 to adjust 309 the mean-squared-error loss function to reflect the level of trust in the source of a ground truth instance may be to multiply the loss for a single instance by a distinct numerical constant for each source. For example, response process 10 may multiply the error by 0.2 for instances that came from mildly trusted sources (e.g., crowdsourced users), by 0.6 for instances that came from moderately trusted sources (e.g., developers of QA application 20), and 1.0 for instances that came from highly trusted sources (e.g., SMEs). Response process 10 may then compute the mean of the squares of the errors multiplied by these constants instead of the mean of the unmodified error values.

In some implementations, response process 10 may up-weigh the ground truth instances by duplicating the more trusted instances one or more times. For instance, assume for example purposes only that response process 10 has access to 300 highly trusted, 900 moderately trusted, and 2,000 minimally trusted instances. In the example, response process 10 may make 5 copies each of the 300 highly trusted instances and 2 copies each of the 900 moderately trusted instances and put them all together into one 5*300+2*900+2,000=5,300 instance set. Since each of the highly trusted instances appears 5 times in the data set, they will have 5 times as much influence on the total loss assigned to any model. As a result, the model that minimizes loss on the training data (which may be the one the statistical machine learning algorithm of response process 10 is designed to find) will more thoroughly reflect experience from the most trusted data but will still partially reflect experience from the other data. As a result, a model that reflects the more trusted data more thoroughly may be more effective, at least because the levels of trust may be better correlated with the quality of an answer. In the example, instead of having just "correct" and "incorrect" answers, where every "correct" answer may be manually validated by a human annotator (SME), response process 10 may take less time and effort than building a comparably sized ground truth from only highly trusted sources, and may provide better quality than a comparably sized ground truth that may be exclusively pulled from less expensive sources.

As such, in the example, there may be a ranking that returns the first answer over the second answer and/or the third answer (e.g., in response to a query involving the associated question for the first, second, and third answer). As noted above, it will be appreciated that various techniques to return answers may be used without departing from the scope of the disclosure. For example, all three answers may be returned and may be ranked according to the hierarchical confidence level associated with the respective answer. For example, if all three answers are returned, the first answer associated with the first hierarchical confidence level may be returned and ranked higher than the second answer associated with the second hierarchical confidence level and the third answer associated with the third hierarchical confidence level, where the second answer may be ranked higher than the third answer. In some implementations, only the answer associated with the highest available hierarchical confidence level may be returned. For instance, in the example, only the first answer would be returned since it is associated with a higher hierarchical confidence level than the second and third answer. As such, any specific technique to return answers should be taken as example only and not to otherwise limit the scope of the disclosure.

In some implementations, as part of a feedback loop, response process 10 may analyze the correctness of the question, inspect the ground truth instances that went into the answer being correct and have the ability to "up-level" ground truth instances if they are contributing to correct answers. For example, the levels of ground truth may be augmented incrementally by response process 10 with cycles of semi-supervised validation. As will be discussed in greater detail, silver instances with good agreement may be sent by response process 10 to additional judges for validation, and when an agreement threshold is reached those instances may be sent by response process 10 to the SMEs for validation. As such, the number of instances moving through this flow may diminish with time.

For instance, in some implementations, an answer in the second set of ground truth instances may be updated for association with the first set of ground truth instances in response to receiving validation of the answer from a subject matter expert. For example, the second answer may be updated 314 by response process 10 for association with the first hierarchical confidence level in response to receiving validation of the second answer from a subject matter expert. Similarly, the third answer may be updated by response process 10 for association with the second or first hierarchical confidence level in response to receiving validation of the respective trusted source associated with the respective hierarchical confidence level.

Figure 4:
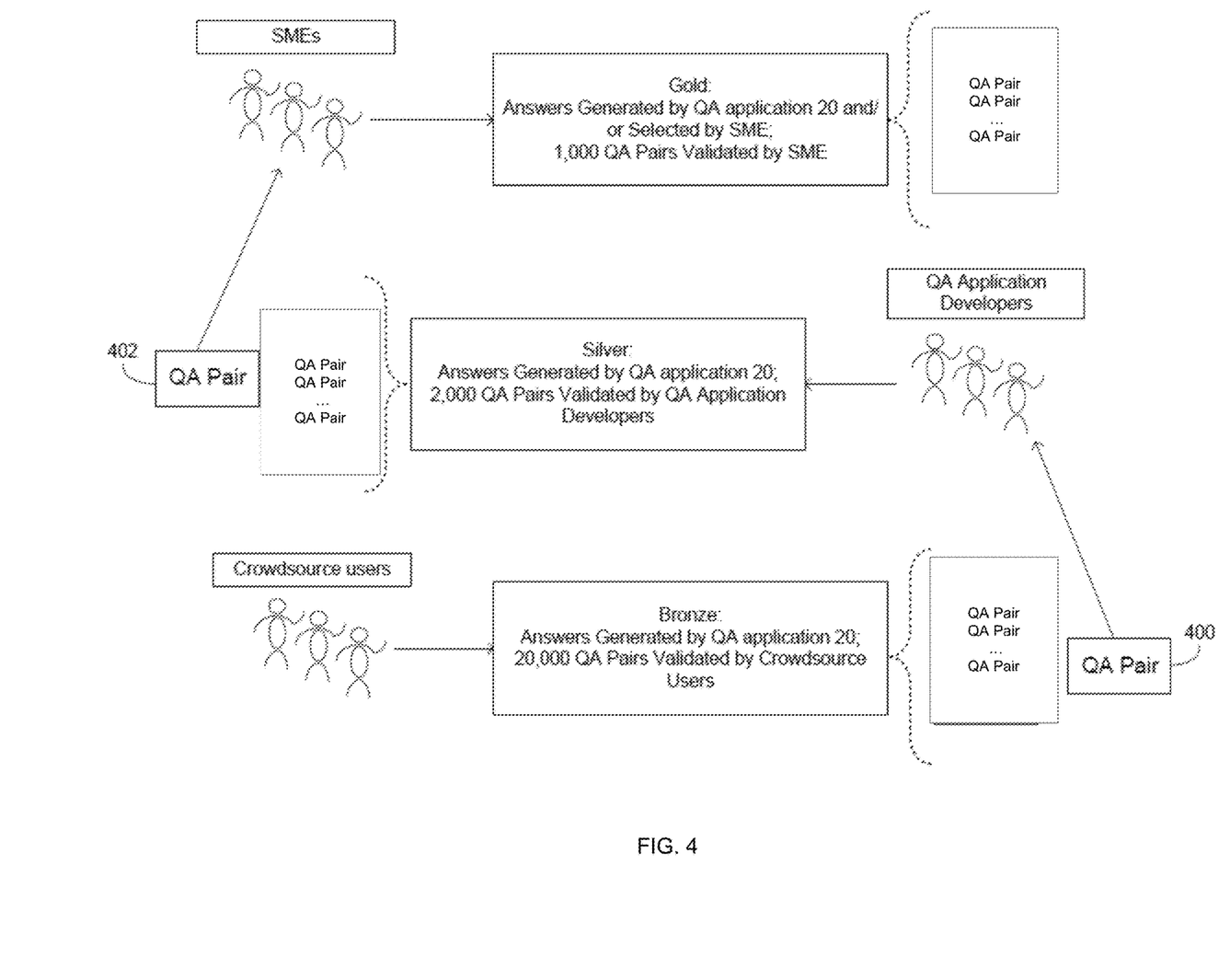
FIG. 4 is an example feedback loop for updating QA pair answers by the response process of FIG. 1 according to one or more example implementations of the disclosure.
Figure 5:
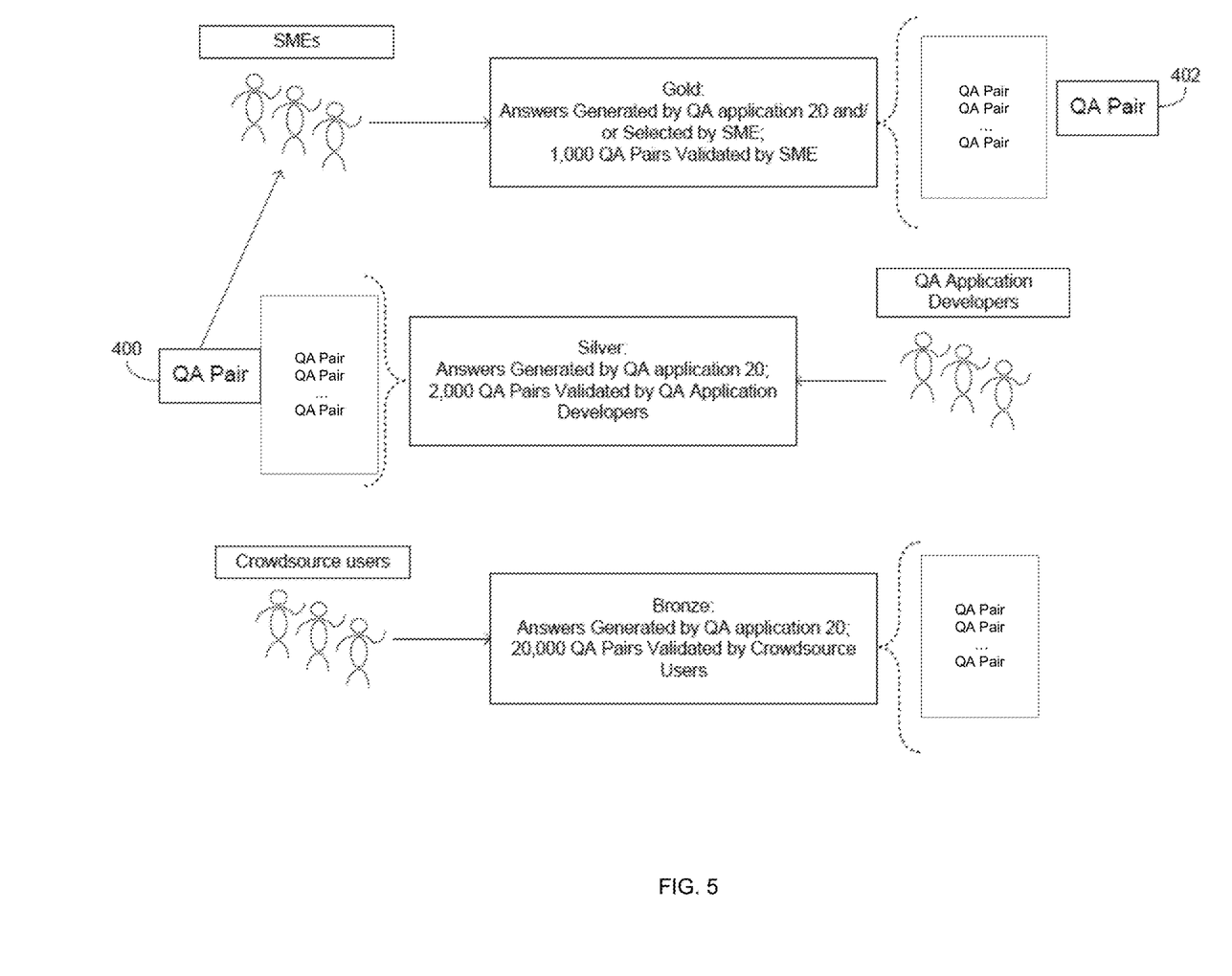
FIG. 5 is an example feedback loop for updating QA pair answers by the response process of FIG. 1 according to one or more example implementations of the disclosure.
Figure 6:
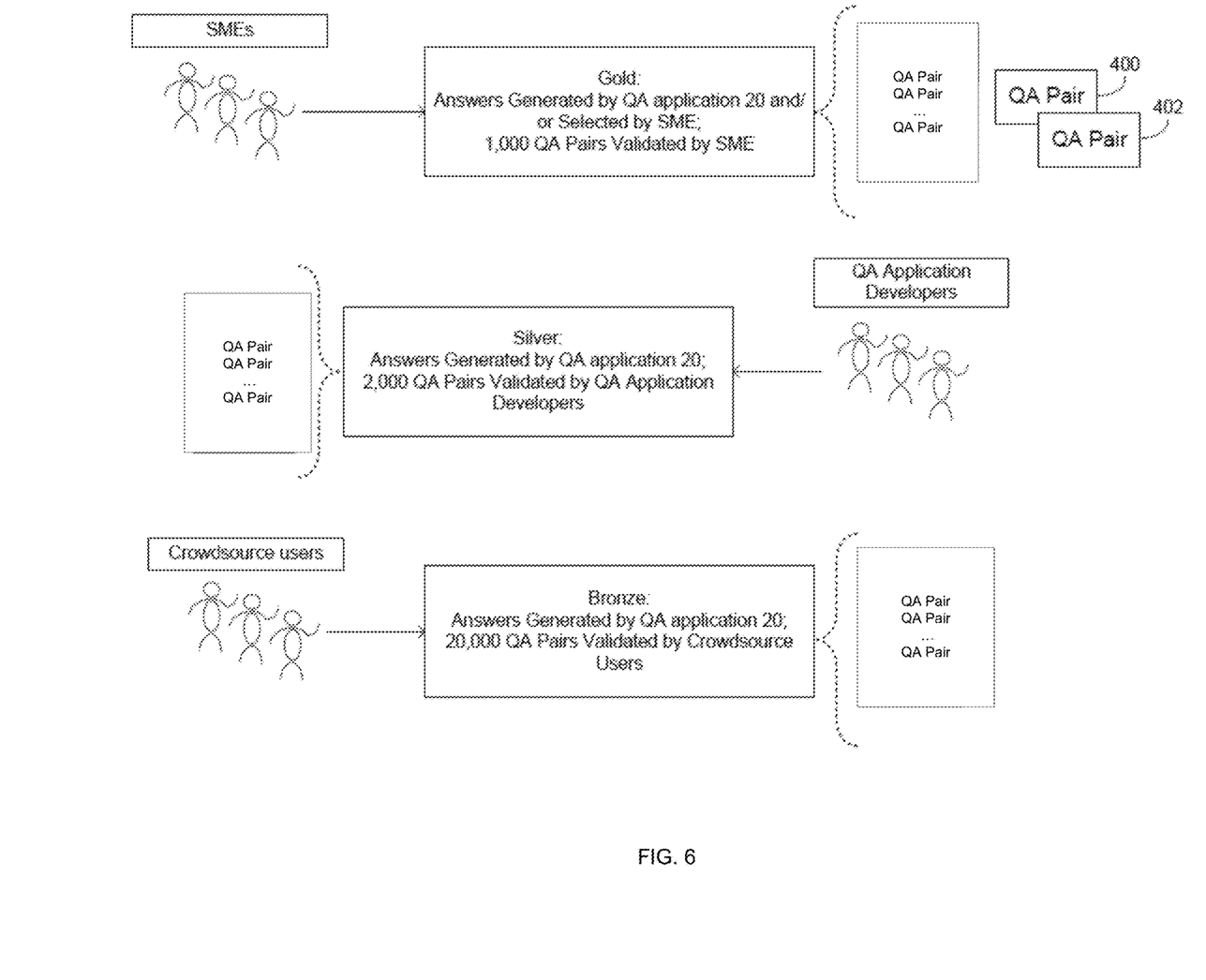
FIG. 6 is an example feedback loop for updating QA pair answers by the response process of FIG. 1 according to one or more example implementations of the disclosure.

For example, and referring at least to FIGS. 4-6, assume for example purposes only that three levels exist for the hierarchical confidence levels. In the example, answers selected and/or validated by SMEs may be the most trusted (e.g., "gold") confidence level, and thus may be associated with the gold hierarchical confidence level. Further in the example, answers validated by developers of QA application 20 may be the second most trusted (e.g., "silver") confidence level, and thus may be associated with the silver hierarchical confidence level. Further in the example, answers validated by one or more of the above-noted crowdsource users may be the third most trusted (e.g., "bronze") confidence level, and thus may be associated with the bronze hierarchical confidence level.

In the example, assume that the third answer is associated with QA pair 400, and that the second answer is associated with QA pair 402. In the example, further assume that response process 10 has determined that at least one crowdsource user has validated the answer for QA pair 400, and therefore may be associated with the bronze confidence level. In the example, further assume that response process 10 has determined that at least one developer for QA application 20 has validated the answer for QA pair 402, and therefore may be associated with the silver confidence level. In some implementations, response process 10 may determine that a threshold number (e.g., three) of crowdsource users has validated the answer for QA pair 400. In response, the answer for QA pair 400 may be identified and submitted to one or more developers for QA application 20 to perform additional verification of the correctness of the answer. In the example, if a threshold number (e.g., one) of developers of QA application 20 validate the answer for QA pair 400, response process 10 may update its associated confidence level from bronze to silver (as shown in FIG. 5). In some implementations, response process 10 may use techniques such as, e.g., the minimax entropy principle to improve the quality of so-called "noisy labels" from crowdsource users of non-experts to select the "best" answers from the bronze level.

In some implementations, response process 10 may determine that a threshold number (e.g., one) of developers for QA application 20 has validated the answer for QA pair 402. In response, the answer for QA pair 402 may be identified and submitted to one or more SMEs to perform additional verification of the correctness of the answer. In the example, if a threshold number (e.g., one) of SMEs validate the answer for QA pair 402, response process 10 may update 314 its associated confidence level from silver to Gold (as shown in FIGS. 5 and 6). Conversely, in the example, if the threshold number of SMEs do not validate the answer for QA pair 402, response process 10 may maintain the answer for QA pair 402 in the silver level.

In some implementations, and referring at least to FIG. 5, response process 10 may determine that a threshold number (e.g., one) of developers for QA application 20 has validated the answer for QA pair 400. In response, the answer for QA pair 400 may be identified and submitted to one or more SMEs to perform additional verification of the correctness of the answer. In the example, if a threshold number (e.g., one) of SMEs validate the answer for QA pair 400, response process 10 may update its associated confidence level from silver to Gold (as shown in FIG. 6). Conversely, in the example, if the threshold number of SMEs do not validate the answer for QA pair 400, response process 10 may maintain the answer for QA pair 400 in the silver level.

In some implementations, the above-noted thresholds for the number of crowdsource users, developers of QA application 20 and/or SMEs may be set (e.g., via response process 10) for a given tolerance window for customer involvement. For instance, a user interface (not shown) associated with response process 10 may enable a user (e.g., the customer SME) to change the number of respective sources (e.g., crowdsource users, QA application 20 developers, SMEs) that may be required to validate a particular answer before graduating the answer to the next hierarchical level of trust. Thus, in the example, response process 10 may enable the collection of less ground truth and the use of less subject matter expert (SME) time and effort to curate the ground truth.

It will be appreciated that while three hierarchical confidence levels are described, more or less levels may be used without departing from the scope of the disclosure. As such, the use of three hierarchical confidence levels should be taken as example only and not to limit the scope of the disclosure. It will also be appreciated that any other sources may be used without departing from the scope of the disclosure. As such, the use of crowdsource users, application developers and SMEs as sources should be taken as example only and not to limit the scope of the disclosure. It will also be appreciated that various sources may provide validations with higher confidence levels without departing from the scope of the disclosure. For example, the crowdsource users may provide validation for answers that provides a higher confidence level than the SMEs (e.g., in more general domains). As another example, each hierarchical level may include varying combinations of each source. As such, the example organization and implementation of the three hierarchical confidence levels should be taken as example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, by a computing device, a first set of ground truth instances from a first source;
receiving a second set of ground truth instances from a second source, the first set of ground truth instances being more trusted than the second set of ground truth instances, the level of trust associated with the second set of ground truth instances being indicative of validation of the second set of ground truth instances by a threshold number of crowdsource users;
weighting the first and second sets of ground truth instances differently based on a level of trust associated with each of the first and second sources;
applying the weighted first and second sets of ground truth instances in a machine learning task executed by a computer at least by adjusting a mean-squared error loss function for the first set of ground truth instances over the second set of ground truth instances to reflect the level of trust associated with the first and second sources;
associating an answer in the second set of ground truth instances with the first set of ground truth instances in response to receiving validation of the answer from a subject matter expert, the level of trust associated with the first set of ground truth instances being indicative of validation of the first set of ground truth instances by the subject matter expert; and
creating a model by duplication of instances from the first set of ground truth instances in a model data set over that of instances from the second set of ground truth instances to cause the first set of ground truth instances to have more influence in answers derived from the model.

2. The computer-implemented method of claim 1 wherein applying the weighted first and second sets of ground truth instances in the machine learning task includes adjusting a loss function for at least one of the first and second sets of ground truth instances based upon, at least in part, the level of trust associated with each of the first and second sources.

3. The computer-implemented method of claim 1 further comprising:
receiving a third set of ground truth instances from a third source; and
weighting the third set of ground truth instances differently than the first and second sets of ground truth instances based on a level of trust associated with each of the first, second, and third sources, wherein the weighted first, second, and third sets of ground truth instances are applied in the machine learning task.

4. The computer-implemented method of claim 3 wherein the level of trust associated with the third set of ground truth instances is indicative of validation of the third set of ground truth instances by QA system developer.

5. A computer program product residing on a non-transitory computer readable storage medium having a plurality of instructions stored thereon which, when executed by a processor, cause the processor to perform operations comprising:
receiving a first set of ground truth instances from a first source;
receiving a second set of ground truth instances from a second source, the first set of ground truth instances being more trusted than the second set of ground truth instances, the level of trust associated with the second set of ground truth instances being indicative of validation of the second set of ground truth instances by a threshold number of crowdsource users;
weighting the first and second sets of ground truth instances differently based on a level of trust associated with each of the first and second sources;
applying the weighted first and second sets of ground truth instances in a machine learning task executed by a computer at least by adjusting a mean-squared error loss function for the first set of ground truth instances over the second set of ground truth instances to reflect the level of trust associated with the first and second sources;
associating an answer in the second set of ground truth instances with the first set of ground truth instances in response to receiving validation of the answer from a subject matter expert, the level of trust associated with the first set of ground truth instances being indicative of validation of the first set of ground truth instances by the subject matter expert; and
creating a model by duplication of instances from the first set of ground truth instances in a model data set over that of instances from the second set of ground truth instances to cause the first set of ground truth instances to have more influence in answers derived from the model.

6. The computer program product of claim 5 wherein applying the weighted first and second sets of ground truth instances in the machine learning task includes adjusting a loss function for at least one of the first and second sets of ground truth instances based upon, at least in part, the level of trust associated with each of the first and second sources.

7. The computer program product of claim 5 further comprising:
receiving a third set of ground truth instances from a third source; and
weighting the third set of ground truth instances differently than the first and second sets of ground truth instances based on a level of trust associated with each of the first, second, and third sources, wherein the weighted first, second, and third sets of ground truth instances are applied in the machine learning task.

8. The computer program product of claim 7 wherein the level of trust associated with the third set of ground truth instances is indicative of validation of the third set of ground truth instances by QA system developer.

9. A computing system including a processor and a memory configured to perform operations comprising:
receiving a first set of ground truth instances from a first source;
receiving a second set of ground truth instances from a second source, the first set of ground truth instances being more trusted than the second set of ground truth instances, the level of trust associated with the second set of ground truth instances being indicative of validation of the second set of ground truth instances by a threshold number of crowdsource users;
weighting the first and second sets of ground truth instances differently based on a level of trust associated with each of the first and second sources;
applying the weighted first and second sets of ground truth instances in a machine learning task executed by a computer at least by adjusting a mean-squared error loss function for the first set of ground truth instances over the second set of ground truth instances to reflect the level of trust associated with the first and second sources;

associating an answer in the second set of ground truth instances with the first set of ground truth instances in response to receiving validation of the answer from a subject matter expert, the level of trust associated with the first set of ground truth instances being indicative of validation of the first set of ground truth instances by the subject matter expert; and creating a model by duplication of instances from the first set of ground truth instances in a model data set over that of instances from the second set of ground truth instances to cause the first set of ground truth instances to have more influence in answers derived from the model.

10. The computing system of claim 9 wherein applying the weighted first and second sets of ground truth instances in the machine learning task includes adjusting a loss function for at least one of the first and second sets of ground truth instances based upon, at least in part, the level of trust associated with each of the first and second sources.

11. The computing system of claim 9 further comprising:
receiving a third set of ground truth instances from a third source; and
weighting the third set of ground truth instances differently than the first and second sets of ground truth instances based on a level of trust associated with each of the first, second, and third sources, wherein the weighted first, second, and third sets of ground truth instances are applied in the machine learning task.

12. The computing system of claim 11 wherein the level of trust associated with the third set of ground truth instances is indicative of validation of the third set of ground truth instances by QA system developer.

* * * * *